United States Patent [19]

Schier

[11] Patent Number: 4,573,697
[45] Date of Patent: Mar. 4, 1986

[54] MOTORCYCLE

[75] Inventor: Günther Schier, Munich, Fed. Rep. of Germany

[73] Assignee: Bayerische Motoren Werke A.G., Munich, Fed. Rep. of Germany

[21] Appl. No.: 717,648

[22] Filed: Mar. 29, 1985

[30] Foreign Application Priority Data

Mar. 29, 1984 [DE] Fed. Rep. of Germany ....... 3411561

[51] Int. Cl.$^4$ .............................................. B62K 25/08
[52] U.S. Cl. .................................. 280/276; 280/219; 280/703
[58] Field of Search ................ 280/276, 703, 219, 210

[56] References Cited

U.S. PATENT DOCUMENTS 4,392,664  7/1983  Tsuchiya et al. .................. 280/276
4,524,844  6/1985  Williams, Jr. ....................... 280/276

Primary Examiner—Joseph F. Peters, Jr.
Assistant Examiner—Donn McGiehan
Attorney, Agent, or Firm—Craig & Burns

[57] ABSTRACT

A motorcycle in which the forward nose-diving during braking is to be prevented. For that purpose, the motorcycle includes a spring-damping system which acts upon a pressure gas space; the pressure gas space is supplied during the braking operation with compressed gas from a pressure reservoir, by way of a control valve. The pressure which builds up in the gas pressure space thereby acts opposite the nose-diving of the motorcycle.

9 Claims, 3 Drawing Figures

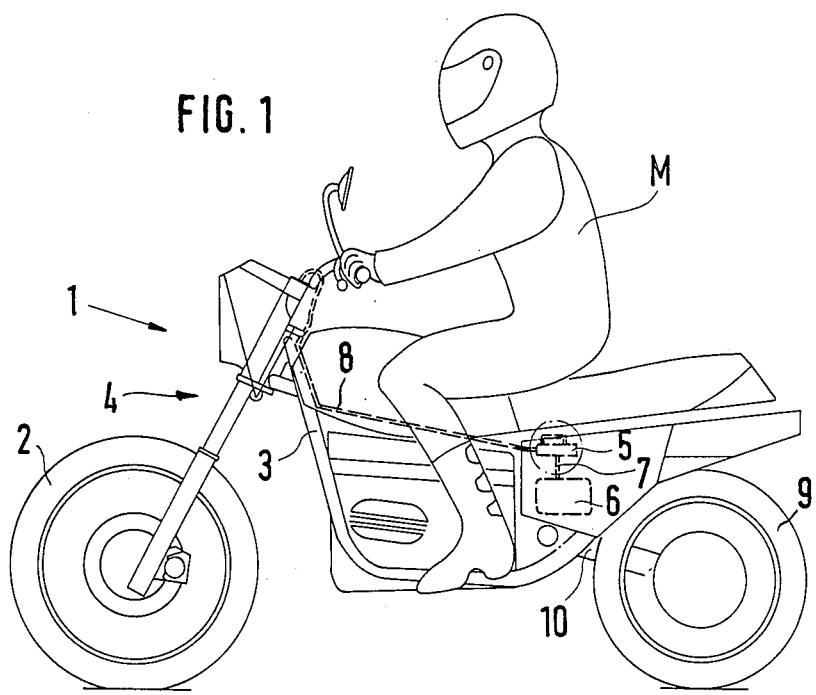
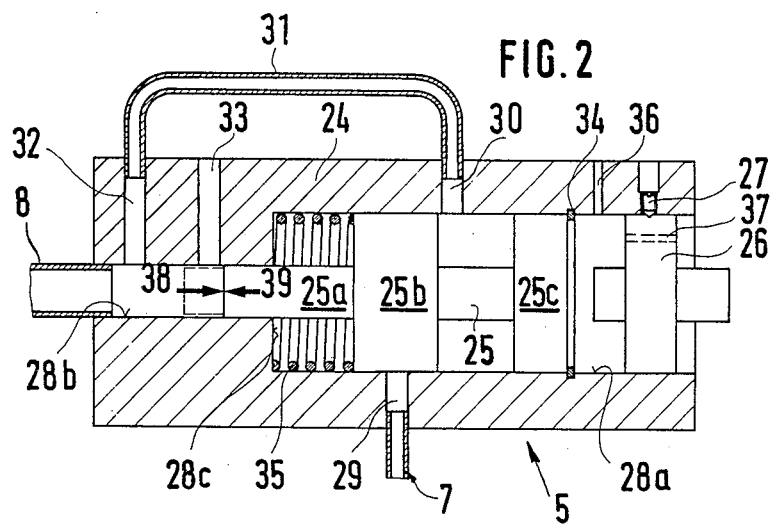

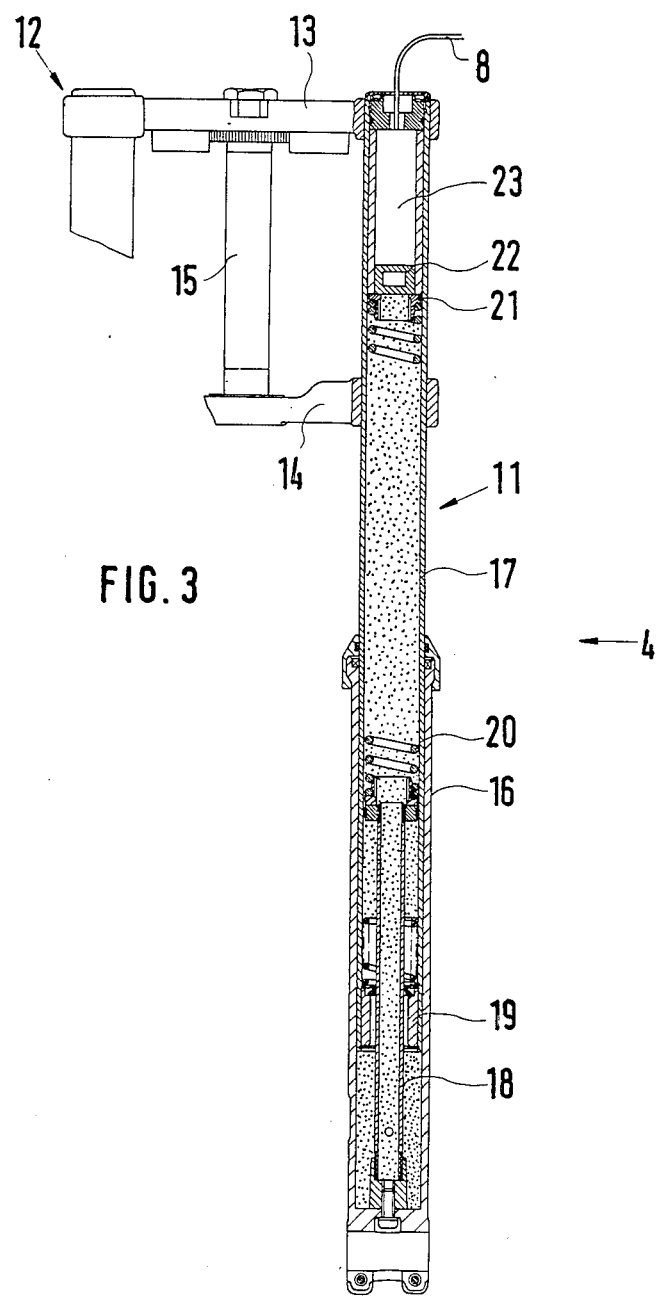

MOTORCYCLE

The present invention relates to a motorcycle, in which the front wheel is arranged at the motorcycle frame by way of a spring-damping system and in which the spring-damping system acts upon a gas pressure space which is connected with a pressure reservoir by way of a closure device during the braking of the motorcycle.

During the braking, a motorcycle nose-dives forwardly, conditioned by the dynamic axle load change, if the front wheel is arranged at the motorcycle frame by way of a spring-damping system. A motorcycle is disclosed in the DE-OS 32 02 740, in which this is to be prevented. During the braking operation, a customary directional control valve connects in that case the gas pressure space of the spring-damping system with a pressure reservoir. The pressure building up in the gas pressure space acts opposite the nose-diving of the motorcycle. The disadvantage of this solution resides in that the entire pressure reservoir of the pressure reservoir exists always in the gas pressure space, independently of the brake force and therewith of the deceleration of the motorcycle. As a result thereof, with a light braking, exactly the opposite may occur; namely, an erecting or raising of the motorcycle.

It is the object of the present invention to so further develop a motorcycle of the type described above that without excessive additional structural expenditures, the pressure in the gas pressure space builds up as a function of the brake force, respectively, of the deceleration of the motorcycle.

The underlying problems are solved according to the present invention in that the closure device is constructed as control valve having a vent channel for the gas pressure space and a slide valve member displaceable by the deceleration of the motorcycle and in pressure-connection with the gas pressure space, which, in its normal position, closes off the feed line from the pressure reservoir to the gas pressure space and opens up the venting of the gas pressure space.

In the motorcycle according to the present invention, always exactly so much pressure is produced in the gas pressure space during the braking as is necessary in order to prevent a forward nose-diving of the motorcycle. Responsible therefor is essentially the closure slide valve member. It opens and closes during the braking operation in alternate sequence the vent channel of the gas pressure space. It is caused to operate in this manner by the opposite forces which act on the same. This involves, on the one hand, the force which is produced by the pressure of the gas pressure space and the effective area of the closure slide valve member, and on the other, the oppositely directed force from the mass of the closure slide valve member and its acceleration. With these forces, an equilibrium will always establish itself whereby the absolute amount of the forces follows the deceleration of the motorcycle and therewith the brake force.

The control valve with the closure slide valve member can be constructed as compact structural part. It is thereby advantageous if, on the one hand, the valve housing includes a reduced through-bore and, on the other hand, the closure slide valve member is constructed as stem part having an outer annular collar. The closure slide valve member can then be guided both with it stem part as also with the annular collar within the through-bore. The through-bore may thereby serve as abutment for the closure slide valve member within the area of its diameter change.

If the closure slide valve member controls the pressure feed of the gas pressure space by means of its annular collar, then it is appropriate to provide two annular collars arranged at a distance from one another. The feed connections for the pressure supply of the gas pressure space then terminate intermediate these annular collars. As a result thereof, the closure slide valve member itself is not acted upon by the pressure within this area.

The necessary mass of the closure slide valve member can be calculated readily on the basis of the data specific of the motorcycle. Appropriately, the normal condition of the motorcycle, i.e., with one driver of average weight is used as base for its design. Since, however, most of the motorcycles also provide a space for a passenger, the conditions change when driving with two persons. In other words, the mass of the closure slide valve member is too small in this case. For that purpose, the present invention provides in an advantageous construction an additional inertia mass which acts on the closure slide valve member. If only one person drives the motorcycle, this inertia mass can be stopped and thus can be rendered inoperable.

These and other objects, features and advantages of the present invention will become more apparent from the following description when taken in connection with the accompanying drawing which shows, for purposes of illustration only, one embodiment in accordance with the present invention, and wherein:

FIG. 1 is a somewhat schematic side elevational view of a motorcycle equipped in accordance with the present invention;

FIG. 2 is a cross-sectional view, on an enlarged scale, through the control valve in accordance with the present invention; and FIG. 3 is a cross-sectional view, also on an enlarged scale, through the front fork of the motorcycle according to FIG. 1.

Referring now to the drawing wherein like reference numerals are used throughout the various views to designate like parts, and more particularly to FIG. 1, a motorcycle generally designated by reference numeral 1 is shown in this figure on which is seated a driver M. The motorcycle includes a front wheel 2 and a frame 3. A spring-damping system, generally designated by reference numeral 4, connects the front wheel 2 with the frame 3. In its rear section, the motorcycle includes a control valve 5 and a pressure reservoir 6. A feed line 7 connects these two elements. The pressure reservoir 6 is preferably supply by way of a pump (not shown) so that always the maximum pressure exists within the same. For the sake of completion, it should be mentioned that the motorcycle 1 additionally includes a rear wheel 9 which is pivotally connected at the motorcycle frame 3 by way of a swinging arm 10.

FIG. 3 illustrates the spring-damping system 4 in front elevation. It is constructed as so-called telefork with two identically constructed fork members generally designated by reference numerals 11 and 12 which are connected with each other by fork bridges 13 and 14. The fork member 12 and the fork bridge 14 are shown only in part for the sake of simplicity. The fork bridges 13 and 14 carry a steering head 15, by way of which the damping-spring system 4 together with the front wheel 2 is pivotally connected at the motorcycle frame 3. The fork member 11 is composed of a tubular slide member 16 and of a vertical tubular member 17 telescopically displaceable therein. The tubular slide member 16 receives the bearing axle of the front wheel 2 (not shown) whereas the fork bridges 13 and 14 are secured at the tubular member 17. An interior tubular member 18 is rigidly connected with the tubular slide member 16. The tubular member 17 includes at its immersed lower end a piston 19 which slides between the tubular slide member 16 and the inner tubular member 18. A compression spring 20 is supported, on the one hand, at a ring 21 secured at the tubular member 17 and, on the other, at a collar-like shoulder of the inner tubular member 18. The fork member is filled with damping fluid up to the ring 21. The structure described so far corresponds to the customary constructions as generally known.

Located opposite the compression spring 20, a piston 22 rests on the ring 21 which can additionally be pressed against its seat by a spring (not shown). A gas pressure space 23 extends above the piston 22. The pressure line 8 according to FIG. 1 terminates in this gas pressure space 23.

The control valve 5 is illustrated in detail in FIG. 2. It includes a valve housing 24 with a control slide valve member 25. Additionally, the valve housing receives an inertia mass 26 arranged coaxially to the closure slide valve member 25, which is adapted to be stopped in the valve housing 24 by a symbolically indicated screw 27. The valve housing 24 includes a bore offset in its diameter for receiving the closure slide valve member 25 and the inertia mass 26. This bore passes over from a section 28a with large diameter into a section 28b with smaller diameter. A shoulder 28c is formed at the transition of the two bore sections. A flow channel 29 terminates in the bore section 28a, to which is connected the feed line 7 of the pressure reservoir 6 (FIG. 1). A further flow channel 30, disposed approximately opposite thereto, leads out of the bore section 28a and passes over into a pressure line 31. This pressure line 31 communicates with a flow channel 32 in the valve housing 24 which again terminates in the bore section 28b. A vent line 33 connects downstream of the flow channel 32, as viewed in the direction of the bore section 28a, the bore section 28b with the atmospheric air.

The closure slide valve member 25 is constructed as elongated piston and projects with its stem portion 25a into the bore section 28b and is also guided therein. Furthermore, the closure slide valve member 25 includes within the area of the bore section 28a two adjacent annular collars 25b and 25c arranged at a distance from one another. The closure slide valve member 25 is guided within the bore section 28a by means of these annular collars 25b and 25c.

The closure slide valve member 25 is in its normal rest position in FIG. 2. It thereby abuts with its annular collar 25c at an abutment 34 inserted into the valve housing 24. A compression spring 35 between the shoulder 28c and the annular collar 25b additionally presses the closure slide valve member 25 against this abutment 34. In its normal position, the closure slide valve member 25 closes with it annular collar 25b the flow channel 29 whereas the flow channel 30 remains open between the two annular collars 25b and 25c. The stem portion 25a terminates in this position shortly behind the vent channel 33 and thus opens up the latter.

Furthermore, it should be noted that the valve housing 24 includes vent bores 36. These vent bores 36 may be complemented or replaced by vent bores 37 in the inertia mass 26.

During a normal inward spring movement of the front wheel, for example, when driving over a road unevenness, the tubular member 17 (FIG. 3) slides into the tubular slide member 16. As a result thereof, damping fluid is displaced which escapes in the direction of the piston 22. The piston 22 is displaced upwardly since the gas present in the pressure space 23 can escape by way of the pressure line 8 and the vent channel 33 (FIG. 3). The spring system is therefore not impaired.

If, however, the driver M brakes the motorcycle, the closure slide valve member 25 experiences an acceleration against the force of the compression spring 35 by reason of its inertia mass. The closure slide valve member 25 valves with its stem portion 25a the vent channel 33 and closes the same (illustrated in FIG. 2 in dash lines). Simultaneously with the closing of the vent channel 33, the closure slide valve member 25 opens the flow channel 29 with its annular collar 25b. Compressed gas can now flow from the pressure reservoir by way of the flow channel 29 into the bore section 28a. From there, it is conducted by way of the flow channel 30, the pressure line 31, and the flow channel 32 into the pressure line 8 and into the gas pressure space 23 (FIG. 3). A pressure builds up within the latter which presses the piston 22 against its seat. On the other hand, owing to the dynamic axle load change, the motorcycle 1 experiences a force pointing downwardly in the axial direction of the fork member 11 which seeks to slide the tubular member 17 into the tubular member 16. Since, however, the damping fluid can no longer escape by displacement of the piston 22, the fork 11 as a whole does not nose-dive.

The pressure of the pressure gas space, however, is also present at the end area of the stem portion 25a of the closure slide valve member 25. The larger this pressure now becomes, the more it acts opposite the acceleration force of the closure slide valve member 25. This condition is symbolically indicated in FIG. 2 by two force arrows 38 and 39. If the force produced by the pressure increase now exceeds the counterforce resulting from the acceleration 39, then the closure slide valve member 25 is again pressed back into its normal position. It partially opens up the vent channel 33 with the consequence that the pressure in the pressure gas space 23 decreases. As a result thereof, the acceleration force 39 again once more predominates and the closure slide valve member 25 again closes the flow channel 33. This alternating cycle continues during the entire braking operation. It can be readily seen that the larger the deceleration of the motorcycle 1, i.e., the more strongly the motorcycle is being braked, the greater becomes the acceleration and therewith the acceleration force 39 of the closure slide valve member 25 and the higher must become the pressure increase in the gas pressure space 23 in order to be able to push back the closure slide valve member 25 in the manner described above.

On the other hand, the force in the downward direction which acts in the telefork is the larger the greater the deceleration of the motorcycle. In order to prevent a nose-diving of the fork member 11, however, also the pressure in the gas pressure space 23 must be correspondingly large. With a proper design and dimensioning of the structural parts, the pressure necessary with a predetermined deceleration of the motorcycle 1 will always establish itself in the gas pressure space 23 by reason of the described relationships. The conditions and the design of the structural parts can be readily determined mathematically by a person skilled in the art.

In the illustrated embodiment, a front wheel fork of customary type of construction is illustrated. However, it is also apparent that the present invention can be utilized with differently constructed front wheel suspensions. Especially, it is also possible that the pressure gas space is not integrated in the fork member but is accommodated in a separate structural part.

Thus, while I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A motorcycle comprising a front wheel, a motorcycle frame means, a spring-damping means operatively connecting the front wheel with the motorcycle frame means, a gas pressure space means acted upon by the spring-damping means, a pressure reservoir, and closure means operatively connecting the gas pressure space means with the pressure reservoir during braking of the motorcycle, the closure means being constructed as control valve means having a vent channel for the gas pressure space means and a closure slide valve member displaceable by the deceleration of the motorcycle and operatively connected with the gas pressure space means, said closure slide valve member being operable in its normal position to close the connection from the pressure reservoir to the gas pressure space means and opening up the venting of the gas pressure space means.

2. A motorcycle according to claim 1, wherein the control valve means includes a valve housing with connections for said pressure reservoir and the venting of the gas pressure space means, said valve housing having an offset through-bore with different diameters in which terminate the connections, the closure slide valve member being constructed as an elongated piston having a stem portion and two external annular collars and being guided in the offset through-bore by means of the two collars.

3. A motorcycle according to claim 2, wherein said two external annular collars are arranged at a distance from one another, and wherein the closure slide valve member valves with its stem portion the venting connection and with its annular collars the pressure reservoir of the gas pressure space means.

4. A motorcycle according to claim 3, wherein the closure slide valve member is held in its normal position by a spring force.

5. A motorcycle according to claim 4, wherein the closure slide valve member is operable to be acted upon by a stoppable inertia mass.

6. A motorcycle according to claim 5, wherein the inertia mass is displaceably retained in the through-bore of the valve housing coaxially to the closure slide valve member.

7. A motorcycle according to claim 1, wherein the closure slide valve member is held in its normal position by a spring force.

8. A motorcycle according to claim 1, wherein the closure slide valve member is operable to be acted upon by a stoppable inertia mass.

9. A motorcycle according to claim 5, wherein the inertia mass is displaceably retained in the through-bore of the valve housing coaxially to the closure slide valve member.

* * * * *